US012515566B2

United States Patent
Sprenger et al.

(10) Patent No.: US 12,515,566 B2
(45) Date of Patent: Jan. 6, 2026

(54) DEVICE FOR LONGITUDINALLY ADJUSTING A SEAT, AND SEAT

(71) Applicant: Adient US LLC, Plymouth, MI (US)

(72) Inventors: Erik Sprenger, Wermelskirchen (DE); Joachim Flick, Hückeswagen (DE)

(73) Assignee: Adient US LLC, Plymouth, MI (US)

( * ) Notice: Subject to any disclaimer, the term of this patent is extended or adjusted under 35 U.S.C. 154(b) by 118 days.

(21) Appl. No.: 18/576,776

(22) PCT Filed: Jul. 4, 2022

(86) PCT No.: PCT/IB2022/056176
§ 371 (c)(1),
(2) Date: Jan. 5, 2024

(87) PCT Pub. No.: WO2023/281380
PCT Pub. Date: Jan. 12, 2023

(65) Prior Publication Data
US 2024/0286530 A1 Aug. 29, 2024

(30) Foreign Application Priority Data

Jul. 7, 2021 (DE) ..................... 10 2021 207 168.6
Dec. 10, 2021 (DE) ..................... 10 2021 214 146.3

(51) Int. Cl.
*B60N 2/08* (2006.01)
(52) U.S. Cl.
CPC ................. *B60N 2/0843* (2013.01)
(58) Field of Classification Search
CPC .................................................. B60N 2/0843
See application file for complete search history.

(56) References Cited

U.S. PATENT DOCUMENTS 7,780,138 B1 * 8/2010 Lee ...................... B60N 2/0843
248/429
11,358,498 B2 * 6/2022 Speck .................. B60N 2/0843
(Continued)

FOREIGN PATENT DOCUMENTS

| DE | 4436221 C1 | 2/1996 |
| DE | 19824038 C1 | 7/1999 |

(Continued)

OTHER PUBLICATIONS

European Patent Office, International Search Report and Written Opinion in Application No. PCT/IB2022/056176, dated Aug. 18, 2022, 13 pages, Rijswijk, Netherlands.

(Continued)

*Primary Examiner* — Anita M King
(74) *Attorney, Agent, or Firm* — Marshall & Melhorn, LLC

(57) ABSTRACT

A device for longitudinally adjusting a seat may have two mutually spaced rail pairs and at least one locking element. The rail pairs are each formed by an upper rail and a lower rail which are movable in relation to one another. The at least one locking element is movably mounted on the upper rail in a spring-loaded manner and, in a locking position, blocks a movement of the upper rail in the lower rail and, in an unlocking position, releases the movement. An undesired movement of the locking element out of the locking position is at least limited or blocked by a blocking element. A seat may have the device longitudinally adjusting a seat.

14 Claims, 12 Drawing Sheets

(56) References Cited

U.S. PATENT DOCUMENTS

| | | |
|---|---|---|
| 2013/0153735 A1 | 6/2013 | Ruthman et al. |
| 2020/0276919 A1 | 9/2020 | Kumagai et al. |
| 2024/0308395 A1* | 9/2024 | Flick .................... B60N 2/0868 |

FOREIGN PATENT DOCUMENTS

| | | |
|---|---|---|
| EP | 1227950 A1 | 8/2002 |
| WO | 2014135145 A1 | 9/2014 |
| WO | 2021193608 A1 | 9/2021 |

OTHER PUBLICATIONS

German Patent Office, Search Report in Application No. DE 10 2021 214 146.3, dated Apr. 19, 2022, 7 pages.

* cited by examiner

DEVICE FOR LONGITUDINALLY ADJUSTING A SEAT, AND SEAT

FIELD

The invention relates to a device for longitudinally adjusting a seat for a seat, in particular a vehicle seat. The invention furthermore relates to a seat, in particular a vehicle seat.

BACKGROUND

A device for longitudinally adjusting a seat generally comprises two rail pairs which are arranged at a distance from one another and are constructed in each case from two rails, an upper rail assigned to the seat and a lower rail assigned to the bottom of a vehicle. The device for longitudinally adjusting a seat furthermore comprises at least one spring-loaded, movable, plate-shaped locking part which is retained on the upper rail and, in a locking position, blocks a movement of the upper rail in the lower rail. Here, the lower rail can have apertures, while the upper rail is provided with openings and the locking part bears, on its two opposite longitudinal sides, projections which, in the locking position, are movable by a spring both into the openings and into the apertures. Such a device for longitudinally adjusting a seat is known, for example, from European Patent EP 1 227 950 B1.

The object of the present invention is to indicate an improved device for longitudinally adjusting a seat as well as a seat with an improved device for longitudinally adjusting a seat.

In terms of the device for longitudinally adjusting a seat, the object is achieved according to the invention with the features of the claims.

In terms of the seat, the object is achieved according to the invention with the features of the claims.

Advantageous further developments are the subject matter of the dependent claims.

SUMMARY

The object is achieved according to the invention with a device for longitudinally adjusting a seat which comprises at least two rail pairs arranged at a distance from one another and at least one locking element, wherein the rail pairs are formed in each case from an upper rail and a lower rail which are movable relative to one another, and wherein the at least one locking element is spring-loaded and retained movably on the upper rail and, in a locking position, blocks a movement of the upper rail in the lower rail and, in an unlocking position, releases a movement, and wherein an undesired movement of the locking element out of the locking position is restricted or blocked by means of a blocking element.

The blocking element is preferably formed as an internal blocking element. In particular, the blocking element is arranged in a cavity formed between the upper rail and the lower rail. As a result of this, the blocking element is arranged in a protected manner and ensures the locking position of the locking element in the locking position even in the case of a mechanical load.

Such a blocking element or stop element ensures that, in the locking position of the locking element, movements which result from mechanical loads, for example, as a result of an accident, for example, a rear-end collision, in particular horizontal movements or transverse movements, of the locking element out of the locking position are at least restricted or completely blocked. As a result of this, the locking element remains in its locking position and thus the device for longitudinally adjusting a seat blocked and the seat in its set longitudinal position. In other words: The blocking element and the locking element form a double lock. Unlocking of the locking element is only possible through a rotational movement of an actuating element, in particular of an unlocking lever. As long as this actuating element is not actuated, the locking element cannot independently unlock as a result of longitudinal load or momentum.

The blocking element can be fastened, for example, to the upper rail. For example, the blocking element can be fastened to the upper rail while engaging through it. Such a fastening of the blocking element to the upper rail enables in a simple manner that the blocking element can be securely moved along with the upper rail in the case of an adjustment of this relative to the lower rail.

For example, the blocking element is arranged on an inner wall of the upper rail in such a manner that an undesired movement, in particular a horizontal movement or transverse movement, of the locking element out of the locking position is blocked or is restricted in such a manner that the locking position of the locking element is secured.

The locking element can additionally be formed, for example, in portions to be oblique or arched or uneven on a side facing the blocking element. The blocking element can be formed to be oppositely oblique or oppositely arched or oppositely uneven in portions on a side that faces the locking element corresponding to the locking element. Such a configuration corresponding to one another of the respectively facing sides, in particular longitudinal sides of the locking element and of the blocking element, additionally enables in a simple manner, in the case of an undesired mechanical load on the upper rail in the longitudinal direction, a wedging of blocking element and locking element so that the locking element is held securely in the locking position. In particular, the locking element remains in the locking position in the case of undesired excitations or shocks in the longitudinal direction.

The upper rail is formed, for example, as a U-profile with two longitudinal sides, of which one longitudinal side is provided with openings for locking engagement by the locking element, wherein the longitudinal side with the openings is formed in portions in a profiled manner. For example, that longitudinal side of the upper rail is provided as a crown profile or in portions with elevations and/or depressions. As a result of this, a distance between the longitudinal sides of upper rail and lower rail is easily adjustable, in particular enlargeable, in order to enable an improved locking function of the locking element.

The upper rail and lower rail are furthermore arranged pretensioned relative to one another by means of the spring-loaded locking element in the locking position. A simple play-free position between upper rail and lower rail is achieved and dynamic control of the locking element is prevented by means of such a spring-loaded locking element. Moreover, the locking element can furthermore be formed as a double lock.

In particular, the locking element is arranged and configured in such a manner that it, in the event of unlocking, is initially in regions in the locking position rotatable into an intermediate position and subsequently can be adjusted from the intermediate position into an unlocking position, in particular linearly or arcuately movable or extractable.

For example, the locking element, in the locking position, is retained in the transverse direction in a force-fitting manner, in particular in a frictionally engaged manner, and is movable in a restricted manner in the vertical direction. In particular, the locking element blocks the upper rail and lower rail in the longitudinal direction.

In order to unlock the lock of upper rail and lower rail, the locking element, in the locking position, is movable by means of the rotation initially out of the force-fitting retention and movable by means of a combined rotational-pulling movement or an arcuate movement from the locking position into the unlocking position, in particular pivotable and extractable.

The advantages achieved with the invention lie in particular in that the locking element remains in its locking position even in the case of undesired mechanical load, for example, as a result of an accident. In particular, the locking element remains in the locking position in the case of undesired excitations or shocks in the horizontal direction or transverse direction.

Moreover, component tolerances can be compensated for by means of the spring-loaded locking element even in the case of very large adjustment angles and mechanical loads can be at least reduced or avoided in the case of control of the locking element. In particular, in the case of high-frequency excitation, the locking element can be only slightly controlled out of the play-free position and then stopped or blocked in a still adequately locked locking position by the stop element or blocking element, in particular a horizontal stop or transverse stop. A dynamic control of the locking element is thus largely prevented. A simple play-free position between lower rail (also referred to as a guide rail) and upper rail (also referred to as a rail runner) is furthermore enabled with the aid of the spring-loaded locking element. Moreover, a simple clamping-catching function is ensured for the locking element without additional components by using a combined movement of rotational movement and pulling movement.

For example, the locking element is held in a pretensioned manner by means of the spring element. The spring element enables the tensioning function. The blocking element enables the catching function for the locking element in the locking position. This means that the locking element is blocked by means of the blocking element in the locking position in the case of undesired mechanical loads and thus "caught" or held. This catching function and thus the blocking of the locking element by the blocking element are circumvented by means of a combined rotational movement and pulling movement of the locking element during its unlocking, in particular in the case of a desired unlocking movement out of the locking position, so that the rail pair is unlocked and the upper rail is movable, in particular adjustable, relative to the lower rail.

The locking element is formed as a horizontal lock and locks in this case upper rail and lower rail relative to one another in a simple manner with a play-free position. In other words: The upper rail and lower rail are pretensioned relative to one another by means of the spring-loaded locking element in the locking position. For example, the locking element is formed as a locking plate from which several projections, in particular teeth, protrude laterally at least on one of the sides, in particular a longitudinal side. The locking element can furthermore be formed as a double lock.

A further development provides an actuating element for the locking element, wherein the actuating element is arranged in an inner space formed between the upper rail and the lower rail. In particular, the actuating element is arranged inside the upper rail. Such an arrangement of the actuating element inside a respective rail pair enables a particularly compact arrangement.

For example, the upper rail has a through-opening through which the actuating element is actuable.

A further aspect provides that the actuating element is arranged movably on the upper rail, in particular is rotatably mounted. For example, the actuating element is formed as an actuating lever. By rotating the actuating element, the locking element, in its locking position, can be rotated into an intermediate position in order subsequently to be adjusted, in particular pulled, from this intermediate position into the unlocking position, for example, linearly or arcuately moved.

The actuating element can furthermore comprise at least one actuating region and a coupling region.

For example, the actuating region projects at least into or through the through-opening. This actuating region can be actuated in a manner not represented in greater detail by means of an unlocking device by motor, in particular by electric motor, or manually.

The coupling region comprises, for example, at least one hook-shaped projection and a control cam. By means of the control cam of the actuating element, the locking element is adjustable by means of a combined rotational-pulling movement between the locking position and the unlocking position. For example, the locking element, in the locking position, is rotatable by a first rotational movement of the actuating element in such a manner that the locking element is adjusted into a free space for a linear movement. By means of the hook-shaped projection, the locking element can in the case of further rotation of the actuating element be moved, in particular extracted, from the locking position into the unlocking position linearly, in particular approximately linearly.

The object is furthermore achieved by a seat, in particular a vehicle seat, with the device for longitudinally adjusting a seat described above.

In summary and expressed in other words, a device for longitudinally adjusting a seat is provided by the invention which enables a simple play-free position between guide rail (also referred to a lower rail) and rail runner (also referred to as an upper rail) with the aid of the locking element and prevents a dynamic control of the locking element. The unlocking of the locking element is configured so that it is initially rotated downwards and thereafter is extracted from the toothing of the guide profile. In the event of a high-frequency excitation, the locking element can only be controlled slightly out of the play-free position and is then stopped in a still adequately locked position by the transverse stop (also referred to as a blocking element).

DESCRIPTION OF THE FIGURES

Exemplary embodiments of the invention are explained in greater detail on the basis of the drawings. In the drawings.

DETAILED DESCRIPTION

Corresponding parts are provided in all the figures with the same reference signs.

Figure 1:
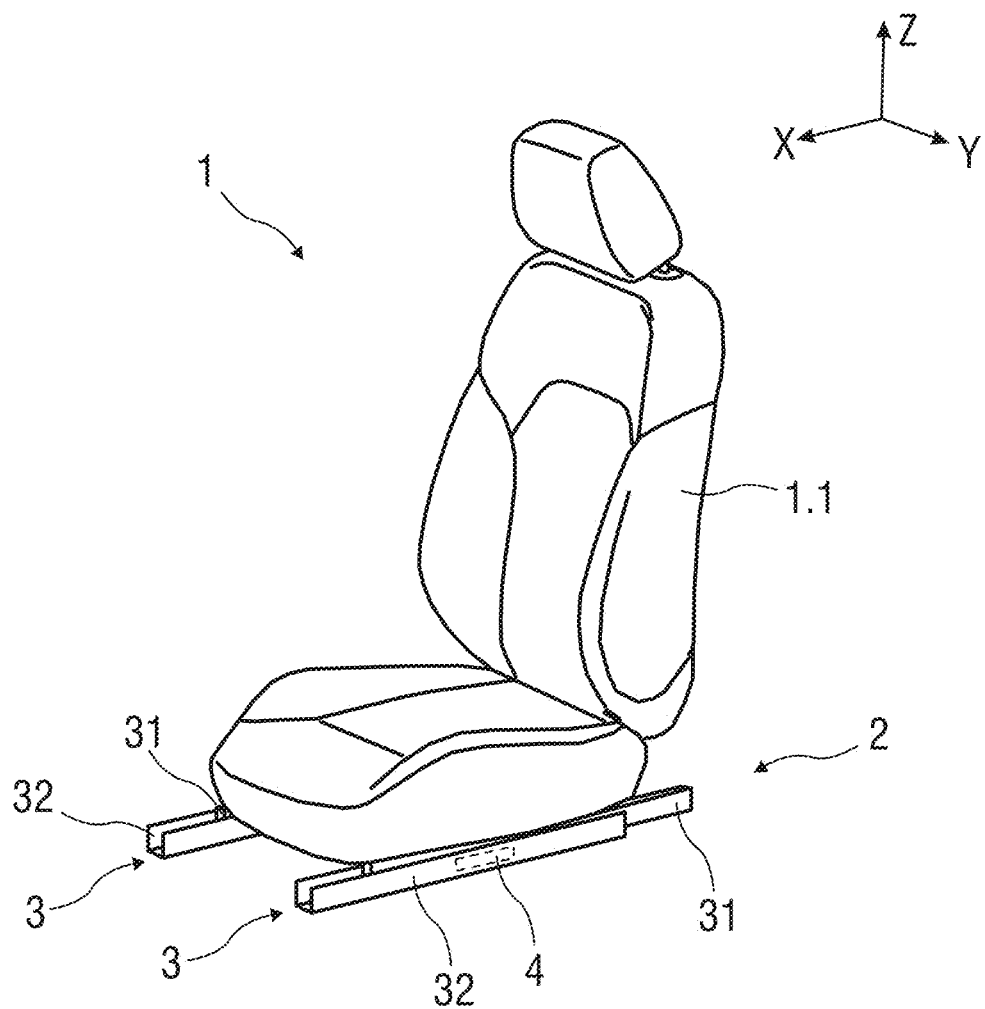
FIG. 1 schematically shows, in a perspective representation, a seat, in particular a vehicle seat, with a device for longitudinally adjusting a seat comprising two rail pairs, FIG. 2 schematically shows a sectional representation through a rail pair according to the invention according to a first exemplary embodiment in the region of a locking element, FIG. 3 schematically shows a sectional representation through a further alternative rail pair according to a second exemplary embodiment in the region of a locking element, FIG. 4 schematically shows a perspective representation of an upper side of an upper rail, FIG. 5 schematically shows a perspective representation of a lower side of the upper rail, FIGS. 6 to 8 schematically show a sequence of an unlocking of the locking element, FIG. 9 schematically shows, in a sectional representation in the longitudinal direction, a device for longitudinally adjusting a seat according to a third exemplary embodiment, and FIGS. 10 to 12 schematically show a sequence of an unlocking of the locking element according to FIG. 9.

FIG. 1 schematically shows, in a perspective representation, a seat 1, in particular a vehicle seat, with a device for longitudinally adjusting a seat 2. The seat 1 is arranged by means of the device for longitudinally adjusting a seat 2, for example, on a vehicle chassis, not represented in greater detail.

The seat 1 represented schematically in FIG. 1 is described below using three spatial directions running perpendicular to one another. In the case of a seat 1 installed in the vehicle, a longitudinal direction x runs largely horizontally and preferably parallel to a longitudinal direction of the vehicle which corresponds to the conventional direction of travel of the vehicle. A transverse direction y which runs perpendicular to the longitudinal direction x is likewise oriented horizontally in the vehicle and runs parallel to a transverse direction of the vehicle. A vertical direction z runs perpendicular to the longitudinal direction x and perpendicular to the transverse direction y. In the case of a seat 1 installed in the vehicle, the vertical direction z runs preferably parallel to a vertical axis of the vehicle.

The indications of position and the indications of direction used, such as, for example, front, rear, top and bottom relate to a direction of view of an occupant sitting in the seat 1 in a normal sitting position, wherein the seat 1 is installed in the vehicle in a position of use which is suitable for conveying people with an upright backrest 1.1 and as is commonplace is oriented in the direction of travel. The seat 1 can, however, also be installed or moved in an alternative orientation, for example, opposite to the direction of travel.

The device for longitudinally adjusting a seat 2 comprises, for example, two rail pairs 3 which are arranged at a distance from one another. The respective rail pair 3 comprises an upper rail 31, also referred to as a rail runner or seat rail, and a lower rail 32, also referred to as a guide rail or base rail. The upper rail 31 is arranged to be longitudinally adjustably on the lower rail 32 between a front end location and a rear end location. This adjustability allows a longitudinal setting of the position of the seat 1, wherein the front end location of the upper rail 31 is assigned to the foremost position of the seat 1 and the rear end location of the upper rail 31 is assigned to the rearmost position of the seat 1.

The device for longitudinally adjusting a seat 2 furthermore comprises at least one locking element 4. Each rail pair 3 can then comprise an associated locking element 4, as will be described below in greater detail on the basis of FIGS. 2 to 12.

Figure 2:
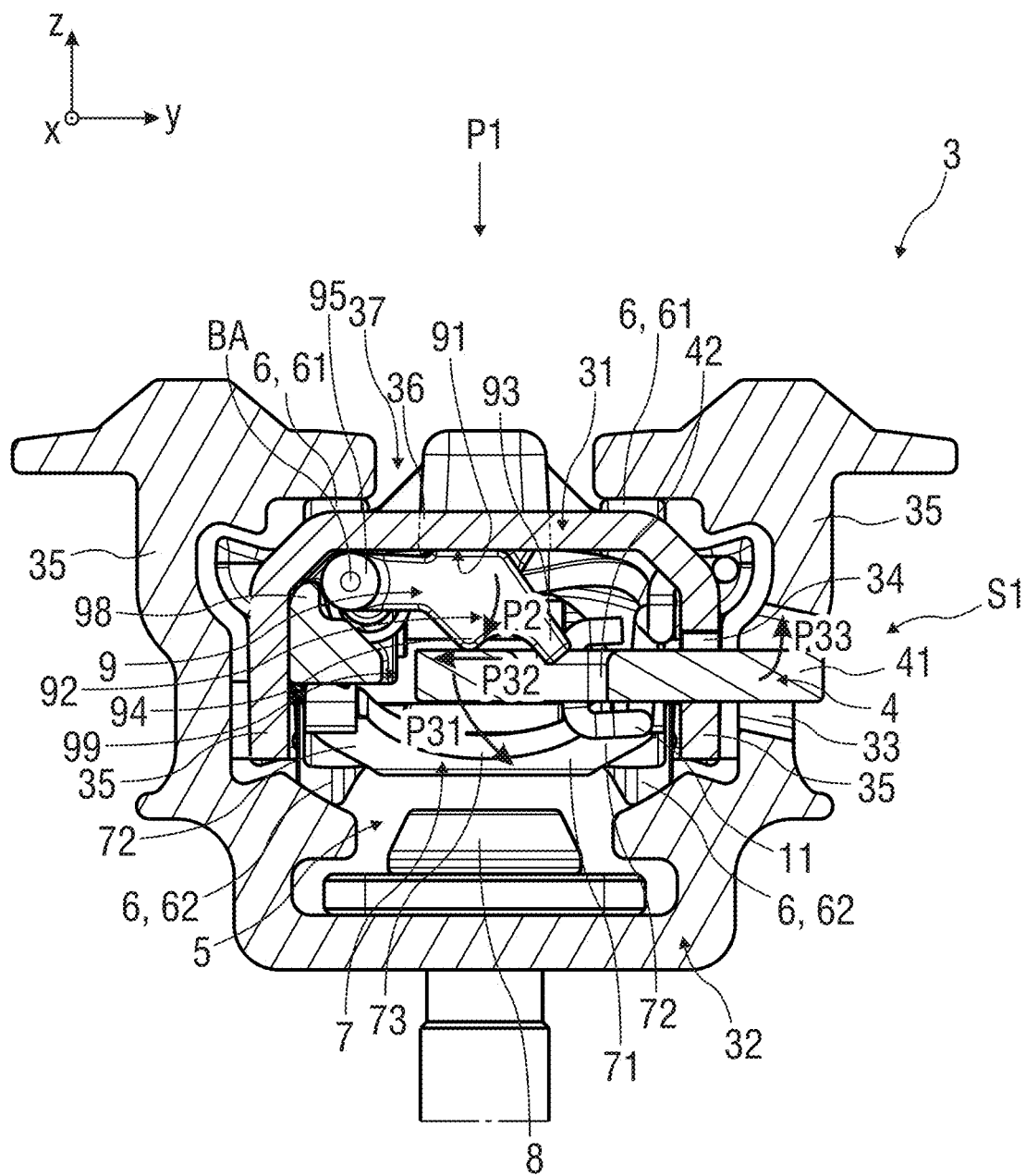

FIG. 2 schematically shows a sectional representation through one of the rail pairs 3 in the region of the associated locking element 4.

Figure 3:
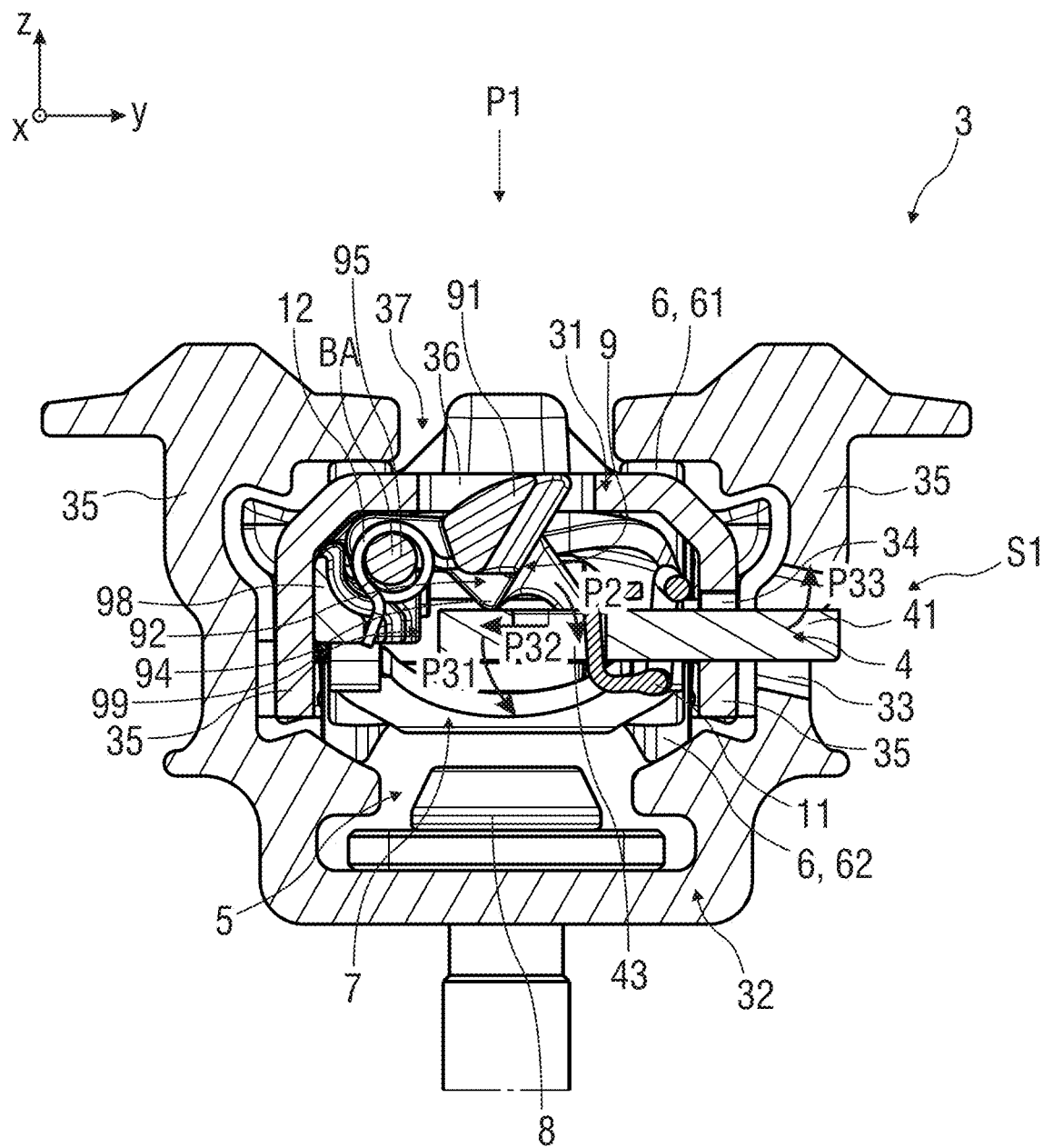

FIG. 3 schematically shows a sectional representation through a further alternative rail pair 3 in the region of the associated locking element 4. The two rail pairs 3 have a substantially identical structure and correspond to one another in terms of structure and function, unless described otherwise below.

The two rail pairs 3 according to FIGS. 2 and 3 differ only in terms of the structure of an actuating element 9 for the locking element 4.

The respective locking element 4 is formed as a double lock. Within the meaning of the invention, the term double lock is understood in particular such that the respective locking element 4 in a locking position S1 (represented in FIGS. 2 to 6 and 9, 10) on one hand blocks a movement of the upper rail 31 (also referred to as a rail runner) relative to the lower rail 32 (also referred to as a guide rail) and on the other hand at least restricts or blocks undesired movements of the locking element 4 in the locking position S1 by means of a blocking element 98.

The at least one locking element 4 is retained or held in a spring-loaded manner and movably on the upper rail 31, in particular mounted rotatably and movably, in particular adjustably by means of a combined rotational-pulling movement or arcuately movably.

The blocking element 98 is arranged in a cavity 5 (represented in FIGS. 2 and 3) formed between the upper rail 31 and the lower rail 32. The blocking element 98 is in particular fastened to the upper rail 31. The blocking element 98 is preferably fastened by a material bond to the upper rail 31, for example, welded. Alternatively, the blocking element 98 can be connected to the upper rail 31 in a form-fitting and/or force-fitting manner.

The locking element 4 is guided, for example, only directly in the latching holes or openings 34 of the upper rail 31, in particular during a pivoting of the locking element 4 in the locking position S1. During an unlocking movement out of the locking position S1 into an unlocking position S2 (represented in FIG. 8), the locking element 4 is unlocked in a controlled manner by the actuating element 9 by means of a combined rotational-pulling movement. The locking element 4 does not have a defined axis of rotation.

Figure 4:
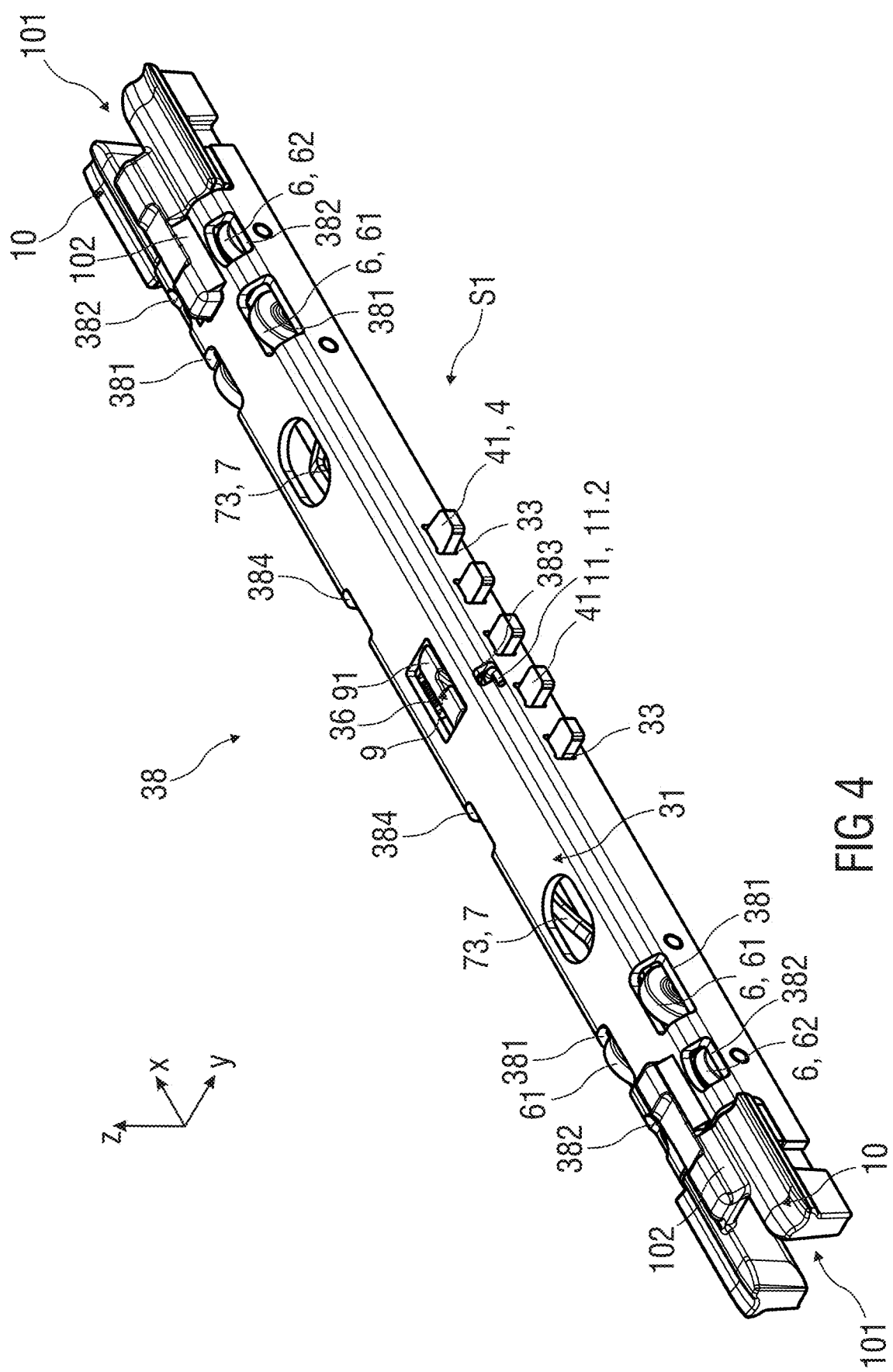

A return element 11 shown in FIGS. 2 to 4, in particular a return spring, is furthermore provided. The return element 11 is held at one end 11.2 on the upper rail 31 and held at the other end 11.1 on the locking element 4. The locking element 4 blocks in a locking position S1, as represented in each case in FIGS. 2 and 3, a movement of the upper rail 31 in the lower rail 32.

The return element 11 is tensioned during unlocking. When the unlocking force is removed, the return element 11 relaxes so that the locking element 4 is returned automatically into the locking position S1 by means of the return element 11. Here, the return element 11, in particular its spring force, is configured such that it pushes the locking element 4 into the locking position S1. In other words: The locking element 4 is adjusted, in particular pushed, in a spring-loaded manner into the locking position S1 so that the upper rail 31 and the lower rail 32 are arranged in a play-free manner relative to one another. In particular, the upper rail 31 and lower rail 32 are pretensioned relative to one another by means of the spring-loaded locking element 4 in the locking position S1.

In particular, the locking element 4 is arranged and configured such that it during unlocking is at least in regions rotatable in the locking position S1 and subsequently is adjustable out of the locking position S1 into an unlocking position S2 (represented in FIG. 8), in particular linearly or arcuately movable or extractable.

For example, the locking element 4, in the locking position S1, is retained in transverse direction y in a force-fitting manner, in particular in a frictionally engaged manner, and movable in a restricted manner in vertical direction z. In particular, the locking element 4 blocks the upper rail 31 and the lower rail 32 in longitudinal direction x.

In order to unlock the lock of upper rail 31 and lower rail 32, the respective locking element 4 according to FIG. 2 or 3 in the locking position S1 is movable by means of the rotation about a rotational axis in longitudinal direction x initially from the force-fitting retention, in particular movable into an intermediate position S3 (represented in FIG. 7), and movable, in particular extractable, by means of the linear or arcuate movement from the locking position S1 into the unlocking position S2.

Figure 8:
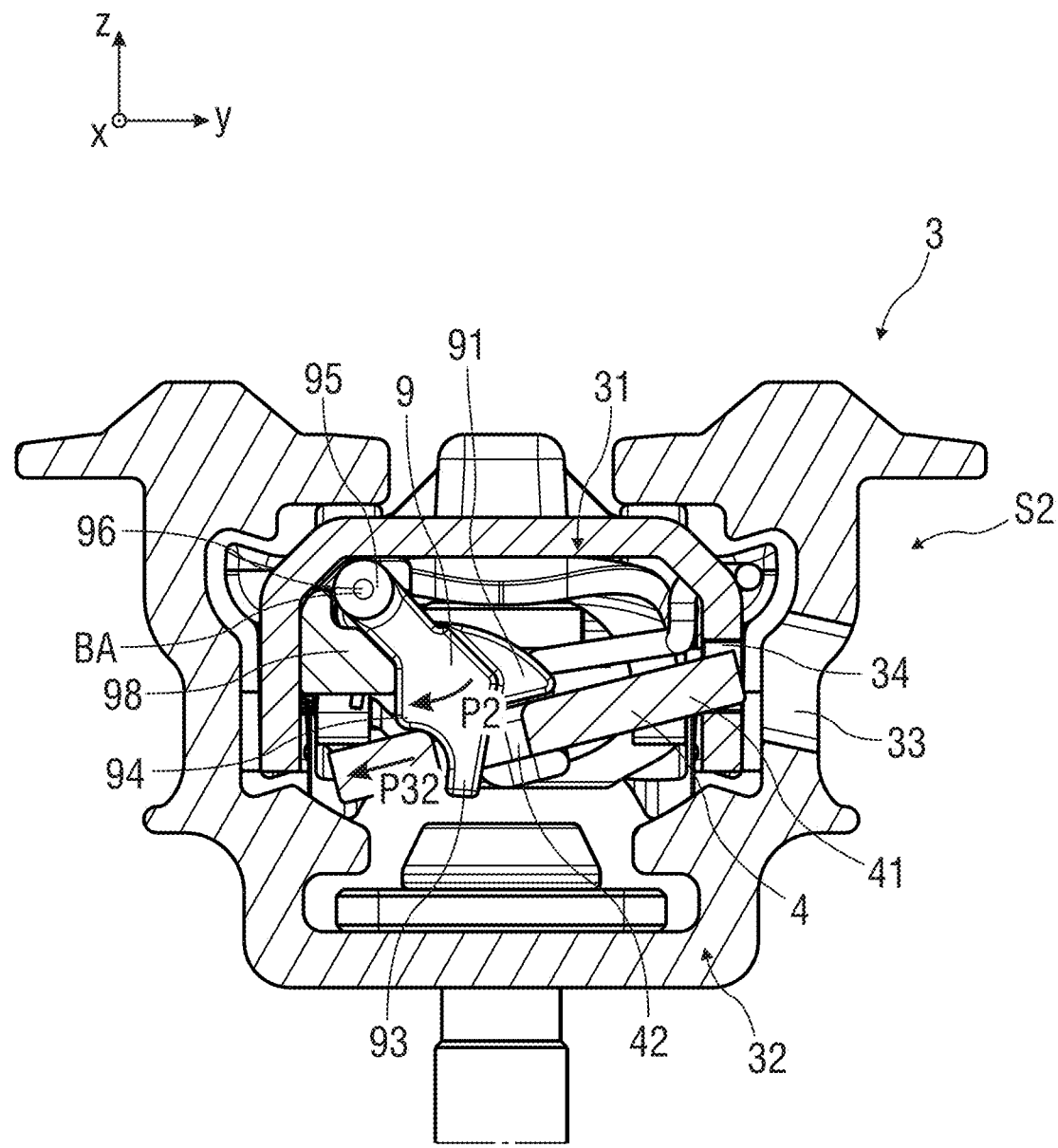

In the unlocking position S2 represented in FIG. 8, the locking element 4 releases a movement of the upper rail 31 with respect to the lower rail 32. The locking element 4 is in this case arranged and configured in such a manner that it, in the event of an unlocking, is rotatable initially in regions in the locking position S1 and subsequently adjustable, in particular extractable, from the locking position S1 into the unlocking position S2 (also referred to as the release position).

The movement sequence during unlocking is described below in detail on the basis of FIGS. 6 to 8. As a result of this, a simple clamping-catching function can be ensured for the locking element 4 without additional components by using a combined movement of the locking element 4 of rotational movement and pulling movement.

The locking element 4 is formed as a horizontal lock in longitudinal direction x. The locking element 4 is furthermore retained in a frictionally engaged manner at least on one of the rails 31, 32, in particular the upper rail 31. A simple play-free position between lower rail 32 and upper rail 31 is achieved with the aid of the spring-loaded locking element 4.

The device for longitudinally adjusting a seat 2 additionally comprises a stop element or the blocking element 98 which at least restricts or blocks undesired movements of the locking element 4 out of the locking position S1. The blocking element 98 is formed, for example, as a profile body which extends along the longitudinal direction x. The blocking element 98 is arranged inside the upper rail 31 and is fastened, in particular welded, thereto. The blocking element 98 can additionally be formed as a bearing for the actuating element 9.

The blocking element 98 is arranged inside the upper rail 31 parallel to the locking element 4. The blocking element 98 extends in longitudinal direction x at least over the entire length of the locking element 4. The blocking element 98 can have a greater length than the locking element 4. The blocking element 98 has a correspondingly shaped stop surface 99 along the side which is directed toward the locking element 4. A dynamic control of the locking element 4 out of its locking position S1 is thus prevented. In particular, the forces introduced undesirably onto the locking element 4 are discharged in the locking position S1 via the blocking element 98 onto the upper rail 31. A catching function for the locking element 4 in its locking position S1 is enabled by means of the blocking element 98.

This catching function and thus the blocking of the locking element 4 by the blocking element 98 are circumvented by means of a combined rotational movement and pulling movement of the locking element 4 during its unlocking so that the rail pair 3 is unlocked and the upper rail 31 is movable, in particular adjustable, relative to the lower rail 32.

For blocking of movement of the upper rail 31 with respect to the lower rail 32 in order to prevent displacement of the seat, the lower rail 32 is provided with a number of apertures 33 and the upper rail 31 is provided with a number of openings 34. Projections 41, in particular tooth-shaped projections 41, of the locking element 4 in the locking position S1 engage into these apertures 33, in particular slot-shaped through-openings, and openings 34, in particular slot-shaped or comb-like openings so that a movement between upper rail 31 and lower rail 32 is blocked. In particular, the projections 41 of the locking element 4 are retained in a frictionally engaged manner at least on one of the rails 31, 32, in particular in the apertures 33 of the upper rail 31.

The upper rail 31 is formed from a sheet metal profile bent in a U-shape. The lower rail 32 is formed, for example, from a pressed aluminum profile. Here, the profiles can be configured such that the in cross-section free ends of the upper rail 31 and the lower rail 32 engage in one another, as a result of which the upper rail 31 is largely fixed in vertical direction z (z-axis direction).

In the mounted location of the upper rail 31 on the lower rail 32, these adjoin a cavity 5 in the interior of the device for longitudinally adjusting a seat 2.

A longitudinal setting of the seat 1 with respect to the vehicle base is performed via a longitudinal displacement of the upper rail 31 with respect to the lower rail 32. In this case, the upper rail 31 and the lower rail 32 are only in contact with one another in certain guidance regions via rolling elements 6. The upper rail 31 (also referred to as a rail runner) is in normal operation in the case of a longitudinal setting of the seat in vertical direction z (z-axis direction) fixed in a sprung-pretensioned manner with respect to the lower rail 32 and is movable in longitudinal direction x (x-axis direction) by at least one or more of these rolling elements 6. In the remaining region, the lower rail 32 and the upper rail 31 are spring-pretensioned via the rolling elements 6 as a result of the bearing and thus arranged in a play-free manner at a distance from one another.

For the purpose of spring pretensioning of the upper rail 31 with respect to the lower rail 32 via the at least one rolling element 6, a pretensioning element 7 is provided which is arranged within the upper rail 31. In particular, the pretensioning element 7 is arranged in the cavity 5.

The pretensioning element 7 enables a simple play-free position between the lower rail 32 and the upper rail 31 even during longitudinal adjustment of the seat 1. The movable upper rail 31 is moved in a spring-tensioned manner in the lower rail 32.

For this purpose, the pretensioning element 7 is embodied as a multi-function component which is formed simultaneously as a carrier, spring and bearing for at least one or more of the roller elements 6. The pretensioning element 7 is in particular a profile element, a shaped sheet metal part or a punched sheet metal part.

For example, the pretensioning element 7 comprises a carrier region 71 which is formed from a carrier plate. The carrier region 71 is shaped, in particular bent, in such a manner that a bearing region 72 and a spring region 73 are formed. The spring region 73 can be formed, for example, as a leaf spring with an internal hole, for example, in the form of an elongated hole. The spring region 73 can be bent multiple times. The bearing region 72 is formed to receive a bearing bolt 60 for a first rolling element 61 or two first rolling elements 61 (as represented).

The corresponding pretensioning is generated by means of the pretensioning element 7 which is supported via the first rolling elements 61 on the lower rail 32 and via the spring region 73 on the upper rail 31, in order to achieve the play-free position between the rails 31, 32 of the respective rail pair 3. In other words: The invention enables a movable upper rail 31 with at least one or more sprung-pretensioned first rolling element(s) 61 with respect to the lower rail 32 to avoid free play in the lower rail 32 or in the guide rail.

For example, the first rolling elements 61 are rotatably mounted on the pretensioning element 7 and are arranged by means of these in a spring-pretensioned manner on the upper rail 31, in particular the rail runner. In this case, the spring region 73 of the pretensioning element 7 supported on the upper rail 31 (rail runner) transmits the pretensioning to the bearing region 72 and via this to the first rolling element(s) 61 which is/are arranged in a sprung-pretensioned manner via openings or recesses 381 in the upper rail 31 on the lower rail 32 in the locking position S1 and/or in the unlocking position S2 or release position rolls/roll in a sprung-pretensioned manner on a contact surface of the lower rail 32.

The device for longitudinally adjusting a seat 2 furthermore comprises for longitudinally adjusting the seat 1 as at least a second rolling element 62 slide rollers or slide cylinders.

Depending on the arrangement of the pretensioning element 7, the first rolling elements 61 (as represented) or the second rolling elements 62 (not represented) can be arranged in a sprung-pretensioned manner on the upper rail 31 and roll off in a sprung manner on the lower rail 32. Thus either the upper rolling elements 61 are fixed and the lower rolling elements 62 are cushioned by means of the pretensioning element 7 or vice versa.

In order to fasten the lower rail 32 to the vehicle chassis, for example, a vehicle base, a fastening bolt 8 is provided which is guided through a through-opening of a base portion of the lower rail 32 in order to be fastened to the vehicle chassis.

For the purpose of longitudinal setting of the seat 1, the device for longitudinally adjusting a seat 2 furthermore comprises the actuating element 9.

The actuating element 9 is arranged in the cavity 5 (also referred to as an inner space) formed between the upper rail 31 and the lower rail 32.

The upper rail 31 has a through-opening 36 through which the actuating element 9 is actuable.

In the exemplary embodiment, the actuating element 9 is formed as an actuating lever, in particular a rotary lever, which is mounted rotatably on the upper rail 31. For this purpose, the actuating element 9 comprises a rotary bearing 95 (represented, for example, in FIG. 2), which is arranged on the upper rail 31. The actuating element 9 furthermore comprises at least one actuating region 91 and a coupling region 92. The actuating region 91 is formed as an actuating arm or actuating projection.

In the embodiment according to FIG. 2, the actuating region 91 in the locking position S1 projects through the through-opening 36 and beyond the upper rail 31 and into the open limb region 37 of the u-shaped lower rail 32 so that the actuating region 91 can be actuated to unlock the locking element 4.

In the alternative embodiment according to FIG. 3, the actuating region 91 of the actuating element 9 projects into the through-opening 36 and is actuable from above through the open limb region 37 of the u-shaped lower rail 32 for unlocking of the locking element 4.

The coupling region 92 is formed in a corresponding manner to the contact region of the locking element 4. The coupling region 92 comprises at least one hook-shaped projection 93 and a control cam 94. For example, the locking element 4 comprises an engagement opening 42, into which the hook-shaped projection 93 of the coupling region 92 engages. The control cam 94 bears against an upper side of the, in particular plate-shaped, locking element 4.

The actuating element 9 is actuated to unlock the locking element 4, wherein the actuating region 91 is actuated in the direction of the through-opening 36 and into this, in particular pushed according to arrow P1, in order to be pivoted about an actuating axis BA according to arrow P2, so that the control cam 94 which is in engagement with the locking element 4 initially tilts the plate-shaped locking element 4 downwards or rotates it according to arrow P31. In this case and by further actuation of the actuating region 91 into the cavity 5, the hook-shaped projection 93 travels into the engagement opening 42 until the hook-shaped projection 93 engages around the locking element 4 and in the event of further actuation pulls its projections 41 completely out of the apertures 33 of the lower rail 32 according to arrow P32. As a result of this, the locking element 4 with its in particular tooth-like projections 41 comes out of engagement with the comb-shaped or slot-shaped apertures 33 of the lower rail 32 so that a release position, not represented, is enabled and the upper rail 31 is movable relative to the lower rail 32, in particular longitudinally adjustable.

The unlocking movement or extraction movement described above is assisted by lower sides, facing the locking element 4, of the actuating region 91 and of the control cam 94. The lower side of the actuating region 91 and the lower side of the control cam 94 come in each case into bearing or contact with an upper side of the locking element 4. In the event of further actuation of the actuating element 9, the hook-shaped projection 93 pushes against the locking element 4, in particular counter to an inner surface of the engagement openings 42 in the direction of arrow P32, wherein the actuating region 91 and the control cam 94 push from above onto the locking element 4 and assist the extraction movement of the projections 41 according to arrow P2.

The actuation of the actuating element 9 is performed as a continuous movement so that the locking element 4 is adjusted from the locking position S1 via the intermediate position S3 into the unlocking position S2 via a continuous combined rotational movement and pulling movement.

FIG. 4 schematically shows a perspective representation of an upper side 38 of the upper rail 31.

The actuating region 91 of the actuating element 9 projects into the though-opening 36. The tooth-shaped projections 41 of the locking element 4 are in the locking position S1 and project through the apertures 33 in the upper rail 31.

At the end side, fastening elements 10 can be provided on the upper rail 31 10. The fastening elements 10 can be formed in different ways depending on the type of seat fastening. In the exemplary embodiment shown according to FIG. 4, the fastening elements 10 are formed as jaw fastenings which comprise in each case a receiving opening 101 into which jaws, not represented in greater detail, of the seat 1 engage in a retaining manner. Alternatively, the fastening element 10 can be designed to fasten the seat 1 to the upper rail 31 by means of a screw connection or weld connection. The respective fastening element 10 is fastened to the upper rail 31 in a force-fitting manner, form-fitting manner and/or by a material bond. For example, the respective fastening element 10 is fastened to the upper rail 31 by means of a weld connection 102.

For spring-pretensioned roller guidance, the upper rail 31 comprises on its upper side 38 recesses 381 (represented in FIG. 4) from which at least the first rolling elements 61 project in order to roll off on the lower rail 32, as shown in FIGS. 2 and 3. The first rolling elements 61 are arranged in a sprung-pretensioned and movable manner by means of the pretensioning element 7 on the upper rail 31 and roll off in a sprung manner on a contact surface of the lower rail 32.

The upper rail 31 can furthermore comprise on its upper side 38 further recesses 382 into which the second rolling elements 62 at least project and run "freely".

The upper rail 31 furthermore has in the region of the locking element 4 at least one further recess 383 in which one end of the return element 11 is held.

Further recesses 384 serve to receive the rotary bearing 95 for the actuating element 9.

Figure 5:
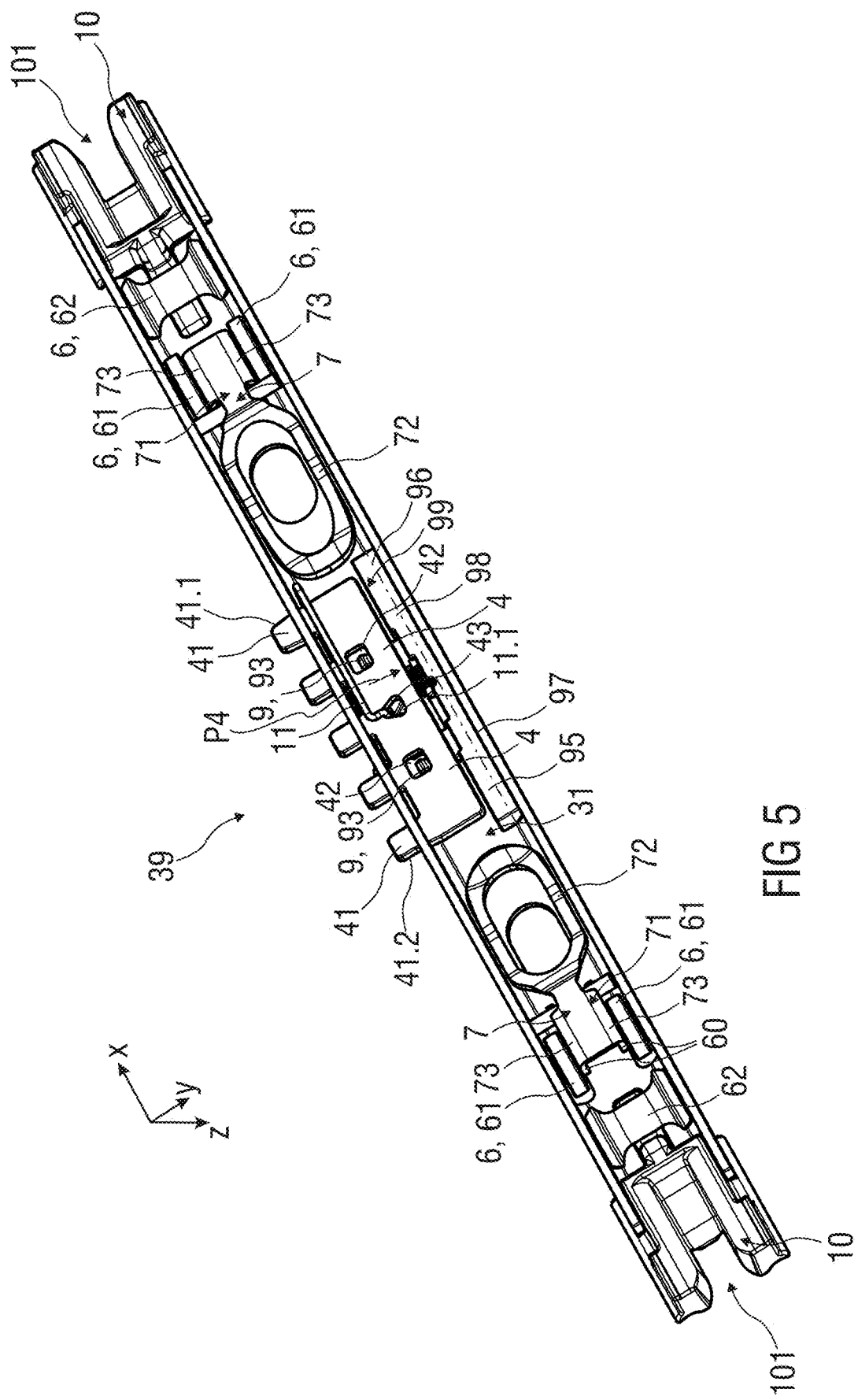

FIG. 5 schematically shows a perspective representation of a lower side 39 of the upper rail 31. The return element 11, in particular a spring, such as a wire spring or a yoke spring, is held at the other end on the locking element 4 in receptacle 43.

As shown in this view, the locking element 4 can comprise two engagement openings 42. Corresponding to this, the actuating element 9 then has two hook-shaped projections 93 which are in engagement with these engagement openings 42. In this case, the device for longitudinally adjusting a seat 2 comprises two second rolling elements 62 which are arranged in each case at one end of the upper rail 31. The second rolling elements 62, in particular the sliding elements for longitudinal adjustment of the seat 1, are formed, for example, as rolling cylinders or thread reels. The second rolling elements 62 have a fixed axis which is fastened to the upper rail 31 and on which the second rolling elements 62 rotate.

The device for longitudinally adjusting a seat 2 furthermore comprises two pretensioning elements 7 which are arranged in each case between one of the second rolling elements 62 and the central locking element 4.

The carrier region 71 of the respective pretensioning element 7 is formed to be laminar and flat. The respective spring region 73 is formed as a yoke spring or punch spring or leaf spring. In each case a pair of first rolling elements 61 are rotatably mounted on the respective pretensioning element 7. For this purpose, the respective pretensioning element 7 comprises, in the associated bearing region 72, the bearing bolts 60 which are represented in FIG. 5.

The rotary bearing 95 of the actuating element 9 comprises a fixed axis 96. The rotary bearing 95 is fastened on the inside to the upper rail 31, in particular welded by means of a weld seam 97. The rotary bearing 95 is formed, for example, as a rod-shaped molded part for carrying and mounting the pivotable actuating element 9.

The rotary bearing 95 can simultaneously form a stop element or the blocking element 98, in particular a horizontal stop or transverse stop, for the locking element 4. Alternatively, the rotary bearing 95 and the blocking element 98 can be formed as separate components. The blocking element 98 is fastened on the inside to the upper rail 31, in particular connected by a material bond by means of the weld seam 97 to the upper rail 31.

Undesired movements of the locking element 4 out of the locking position S1 are restricted or blocked by means of the blocking element 98.

In particular, horizontal movements or transverse movements of the locking element 4, for example, as a result of mechanical loads on the locking element 4, in particular in the case of excitations or shocks in the horizontal direction or transverse direction y (y-axis direction), for example, as a result of an accident, can be at least restricted or completely blocked by means of the blocking element 98. The blocking element 98 is arranged and configured in such a manner that the locking element 4 remains in the locking position S1 despite possible undesired horizontal movements or transverse directions. The device for longitudinally adjusting a seat 2 is thus blocked and the seat 1 is fixed in its set longitudinal position. A catching function for the locking element 4 in its locking position S1 is enabled by means of the blocking element 98.

The rotary bearing 95 and the blocking element 98 can be formed as one component or as separate components. In one possible embodiment, the blocking element 98 is formed as a molded component with the flat stop surface 99.

Some of the projections 41, seen in particular in the longitudinal extension of the locking element 4, a first projection 41.1 and a second, in particular last projection 41.2 of the locking element 4, are formed to be conical at least in regions. In other words: The first projection 41.1 and the second, in particular last projection 41.2 have, in a contact region with the rails 31, 32, in each case an oblique flank which forms a clamping angle. As a result of the formation with oblique flanks on at least the first projection 41.1 and the second, in particular last projection 41.2, the locking element 4, in particular a latching plate, is moved in the case of a higher longitudinal load perpendicular to the longitudinal orientation of the locking element 4 according to arrow P4 in the direction of the blocking element 98 until it comes to bear against the stop surface 99.

The locking element 4 can only be unlocked by the rotational movement of the actuating element 9, in particular of an unlocking lever. As long as this actuating element 9 is not actuated, the locking element cannot automatically unlock as a result of longitudinal load or impulses.

Figure 6:
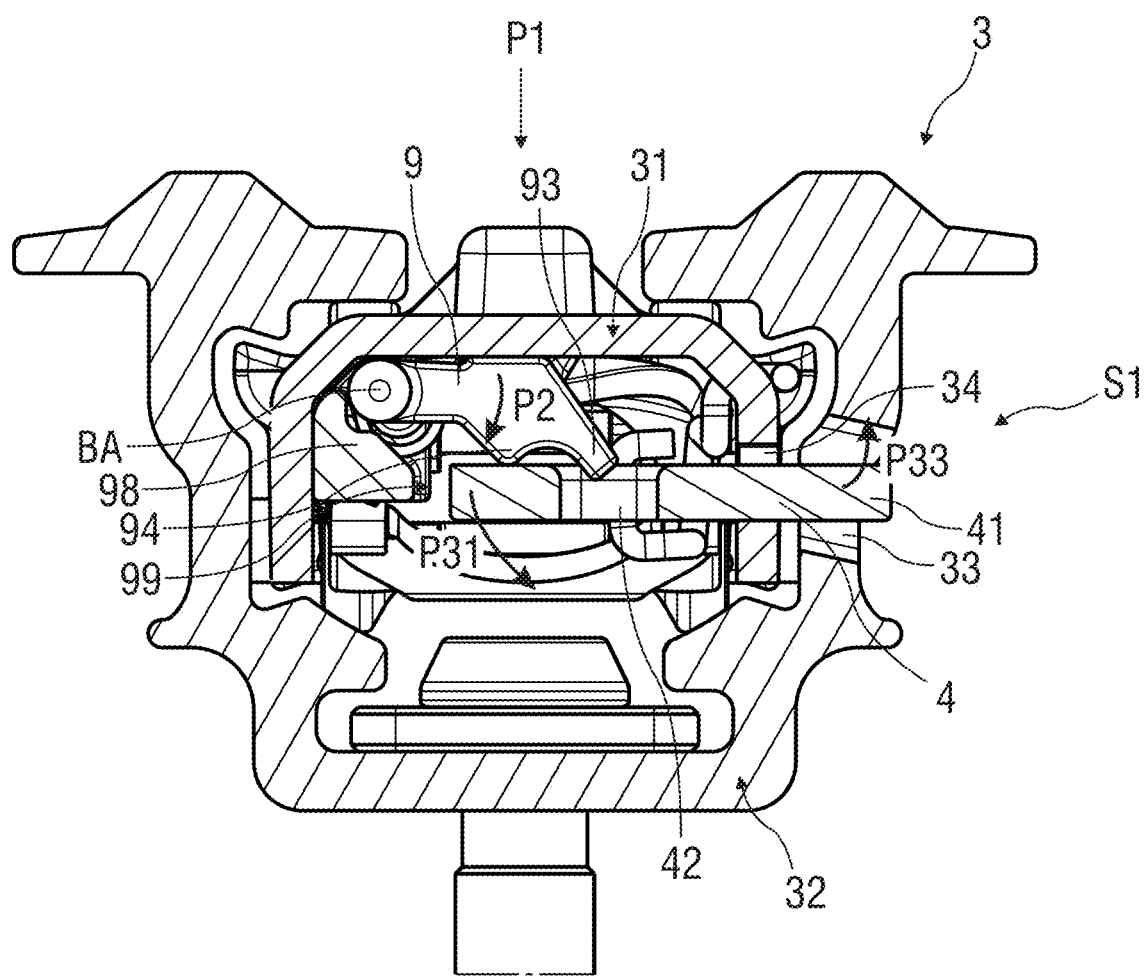
Figure 7:
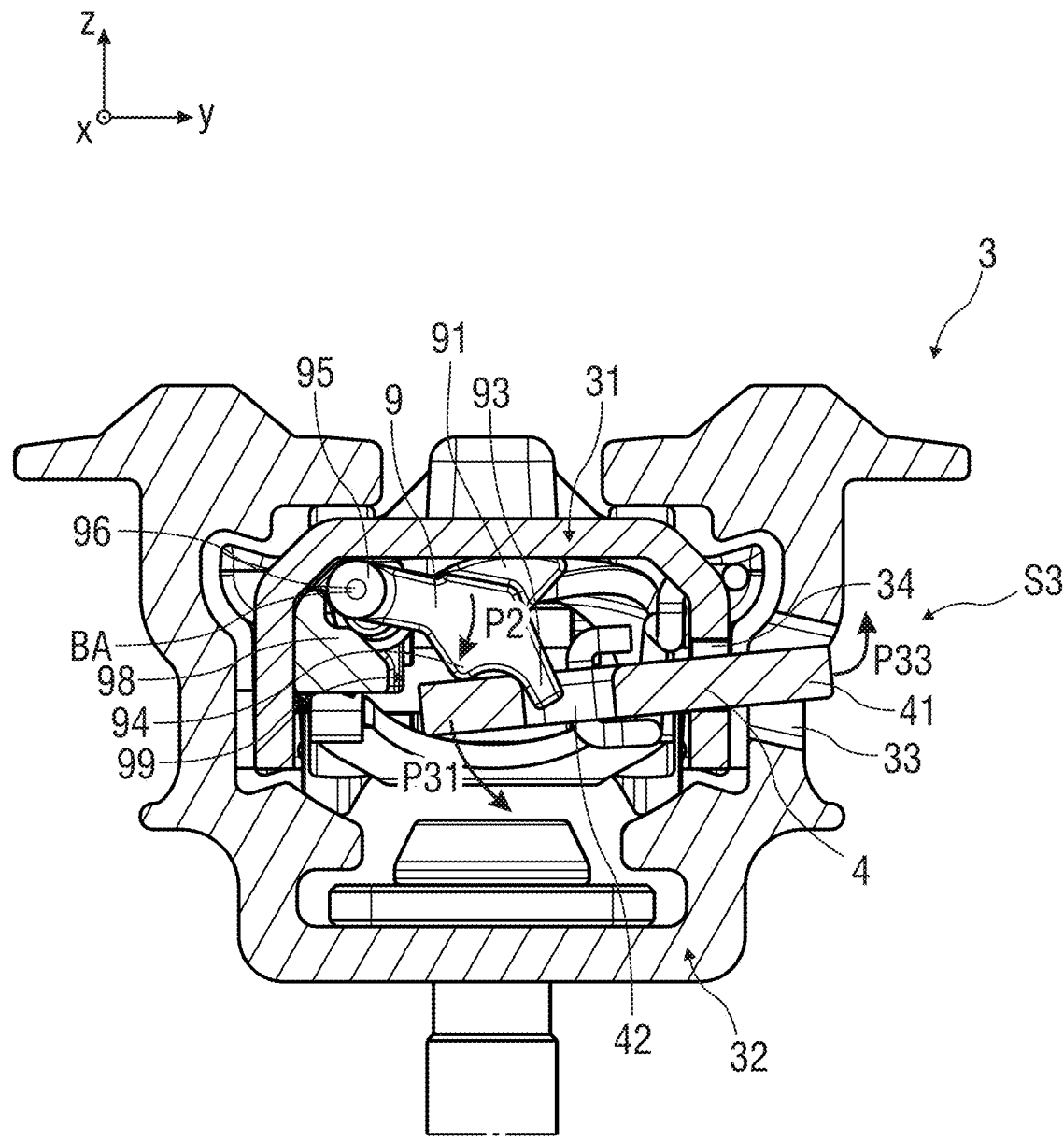

FIGS. 6 to 8 schematically show a sequence of an unlocking of the locking element 4 which is described in greater detail below:

FIG. 6 corresponds to the embodiment according to FIG. 2. Reference is made to the description in relation to FIG. 2. In this embodiment, the rotary bearing 95 and the blocking element 98 are formed separately.

At the start of an unlocking movement of the locking element 4, the actuating element 9 can be actuated mechanically or electromechanically according to arrow P1. Alternatively or additionally, the actuating element 9 can be rotated electromechanically according to arrow P2.

In this case, the actuating region 91 is moved in the direction of the through-opening 36 of the upper rail 31 and actuated into this, in particular pushed according to arrow P1, in order to be rotated or pivoted about an actuating axis A according to arrow P2 so that the control cam 94 which is in engagement with the locking element 4 initially tilts or rotates the plate-shaped locking element 4 downward according to arrow P31. The actuating axis BA is identical to the axis 96 (represented in FIG. 5). The actuating element 9 is rotated into the cavity 5. The locking element 4 performs, still in the locking position S1, in regions the rotational movement or tilting movement according to arrow P31, in particular only a small rotational movement or tilting movement. As a result of the rotational movement of the locking element 4 at its inner end downward according to arrow P31, the projections 41 according to arrow P33, in the locking position S1, are pivoted upward within the openings 34 and the apertures 33, as shown in FIGS. 2 and 3. The projections 41 furthermore engage through both the openings 34 of the lower rail 32 and the apertures 33 of the upper rail 31.

The locking element 4 is adjusted into an intermediate position S3. This is not a fixed position, but rather an intermediate position S3 of a continuous unlocking movement of the locking element 4 controlled by means of the actuating element 9, wherein the unlocking movement is a combined rotational-pulling movement. In the case of the unlocking movement, the locking element 4 within the upper rail 31 is initially pushed downward in order to travel out of the blocking region of the blocking element 98. The locking element 4 is subsequently pulled by means of a pulling force past the blocking element 98 and into the upper rail 31 at least in regions according to arrow P32, as shown in FIGS. 2 and 3.

By further actuation of the actuating region 91, in particular by a rotation according to arrow P2, into the cavity 5, the hook-shaped projection 93 20) travels into the engagement opening 42 of the locking element 4 until the hook-shaped projection 93 engages around or behind the locking element 4.

In the event of further actuation of the actuating element 9, in particular by a further rotation according to arrow P2, the locking element 4, in particular its projections 41, are moved, in particular extracted, fully at least out of the apertures 33 of the lower rail 32 according to arrow P32. As a result of this, the locking element 4 with its in particular tooth-like projections 41 come out of engagement with the comb-shaped or slot-shaped apertures 33 of the lower rail 32 so that the locking element 4 is adjusted into its release position or unlocking position S2 and the upper rail 31 is movable, in particular longitudinally adjustable, relative to the lower rail 32. As a result of this, a simple clamping-catching function can be ensured for the spring-loaded locking element 4 without additional components by using a combined movement of rotational movement and pulling movement.

The actuation of the actuating element 9 is performed as a continuous movement so that the locking element 4 is adjusted from the locking position S1 via the intermediate position S3 into the unlocking position S2 via a continuous combined rotary movement and pulling movement.

In addition to the blocking of the locking element 4 in the locking position S1 by means of the blocking element 98, this can also be formed as a stop element and be arranged, for example, on the upper rail 31 in such a manner that the actuating movement of the actuating element 9 into the unlocking position S2 is at least restricted or blocked. In particular, this movement of the actuating element 9 into the unlocking position S2 is restricted or blocked by means of the blocking element 98 in such a manner that the projections 41 of the locking element 4, in its unlocking position S2, furthermore engage into the openings 34 of the upper rail 31. The actuating element 9 strikes the blocking element 98 in the actuating direction according to arrow P2.

Figure 9:
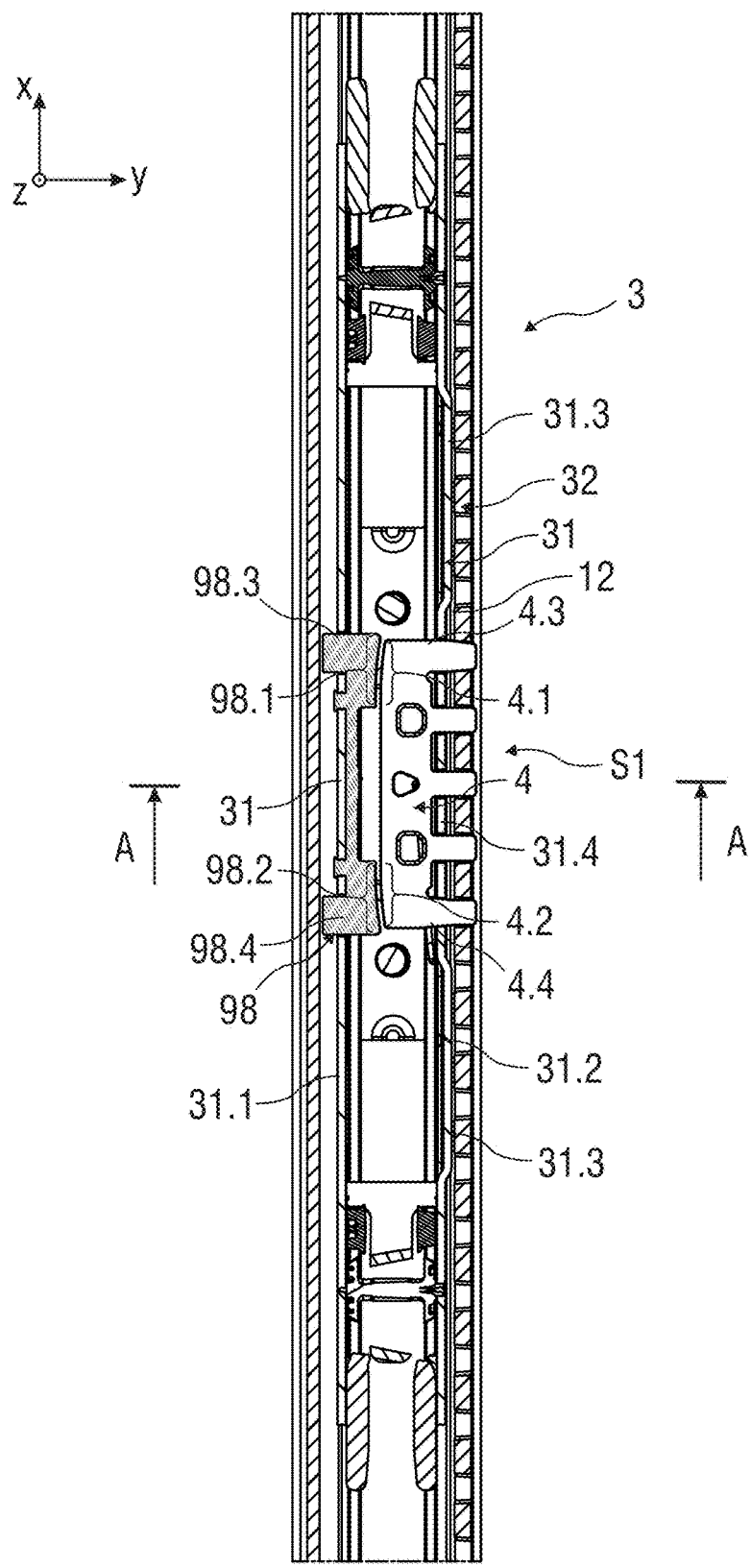

FIG. 9 schematically shows in a sectional representation in longitudinal direction x a device for longitudinally adjusting a seat 2 according to a third exemplary embodiment. The device for longitudinally adjusting a seat 2 differs from the previously described exemplary embodiments of the device for longitudinally adjusting a seat 2 essentially only in terms of the structure of the blocking element 98 and of the locking element 4 as well as of the upper rail 31. All of the other components of the device for longitudinally adjusting a seat 2 correspond to one another in terms of structure and function.

The blocking element 98 according to the third exemplary embodiment is additionally fastened to the upper rail 31 in a manner engaging through it. The upper rail 31 is formed in particular as a U-profile which comprises two longitudinal sides 31.1 and 31.2. For example, the blocking element 98 engages through only one of the longitudinal sides 31.1 or 31.2, in particular a longitudinal side 31.1 opposite the openings 34.

The locking element 4 can be formed to be oblique or arched or uneven in portions on a side that faces the blocking element 98. For example, the locking element 4, as seen in longitudinal direction x, can be formed to be oblique or arched or uneven, in particular wedge-shaped, in portions 4.1, 4.2 at its ends 4.3, 4.4.

The blocking element 98 can be formed to be oppositely oblique or oppositely arched or oppositely uneven in portions on a side that faces the locking element 4 corresponding to the locking element 4. For example, the blocking element 98, as seen in longitudinal direction x, can be formed to be oblique or arched or uneven, in particular wedge-shaped, in portions 98.1, 98.2 at its ends 98.3, 98.4. Such a configuration corresponding to one another of the respectively facing sides of the locking element 4 and of the blocking element 98 additionally enables in a simple manner, in the case of an undesired mechanical load on the upper rail 31 in longitudinal direction x, a wedging of blocking element 98 and locking element 4 so that the locking element 4 is held securely in the locking position S1.

The longitudinal side 31.2 of the upper rail 31 has the openings 34 for locking engagement by the locking element 4. This longitudinal side 31.2 can be formed to be profiled in portions. For example, that longitudinal side 31.2 of the upper rail 31 is formed as a crown profile or is provided in portions with elevations 31.3 and/or depressions 31.4. As a result of this, a rail distance 12, in particular a transverse distance in transverse direction y, between upper rail 31 and lower rail 32 can be easily set, in particular enlarged, in order to enable an improved locking function of the locking element 4.

Figure 10:
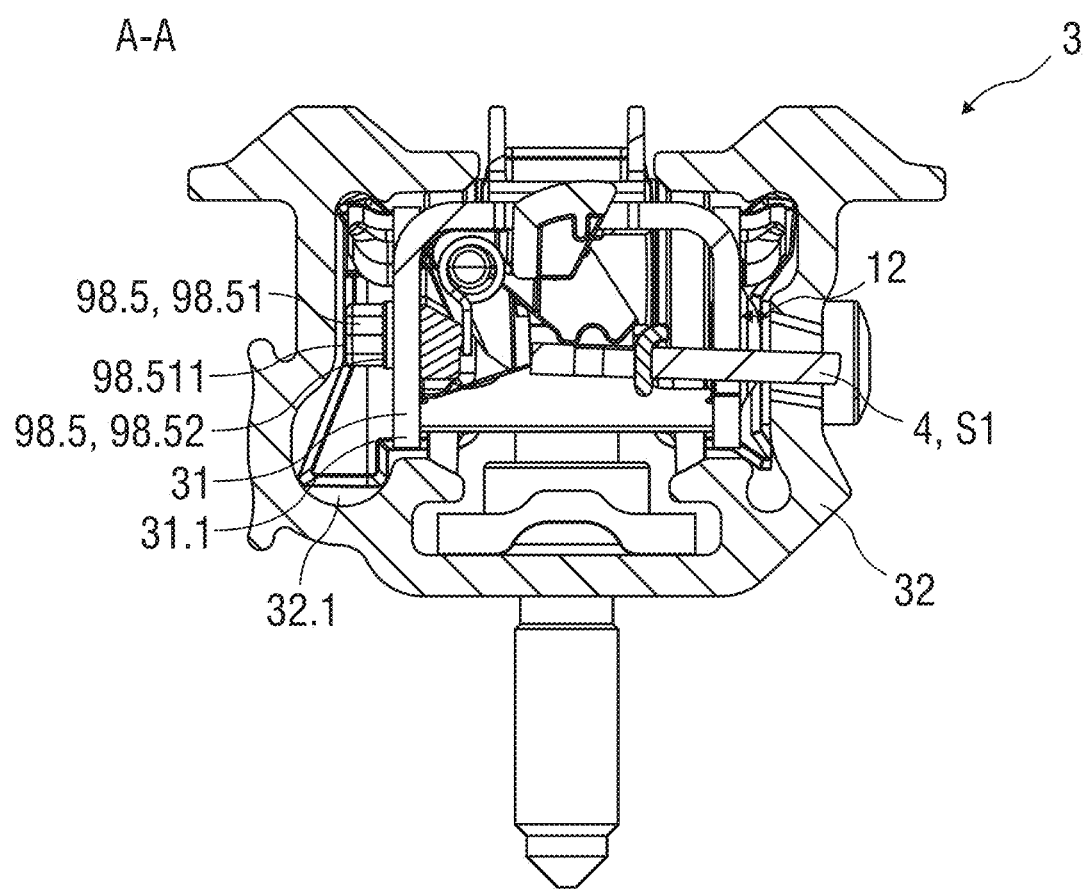
Figure 11:
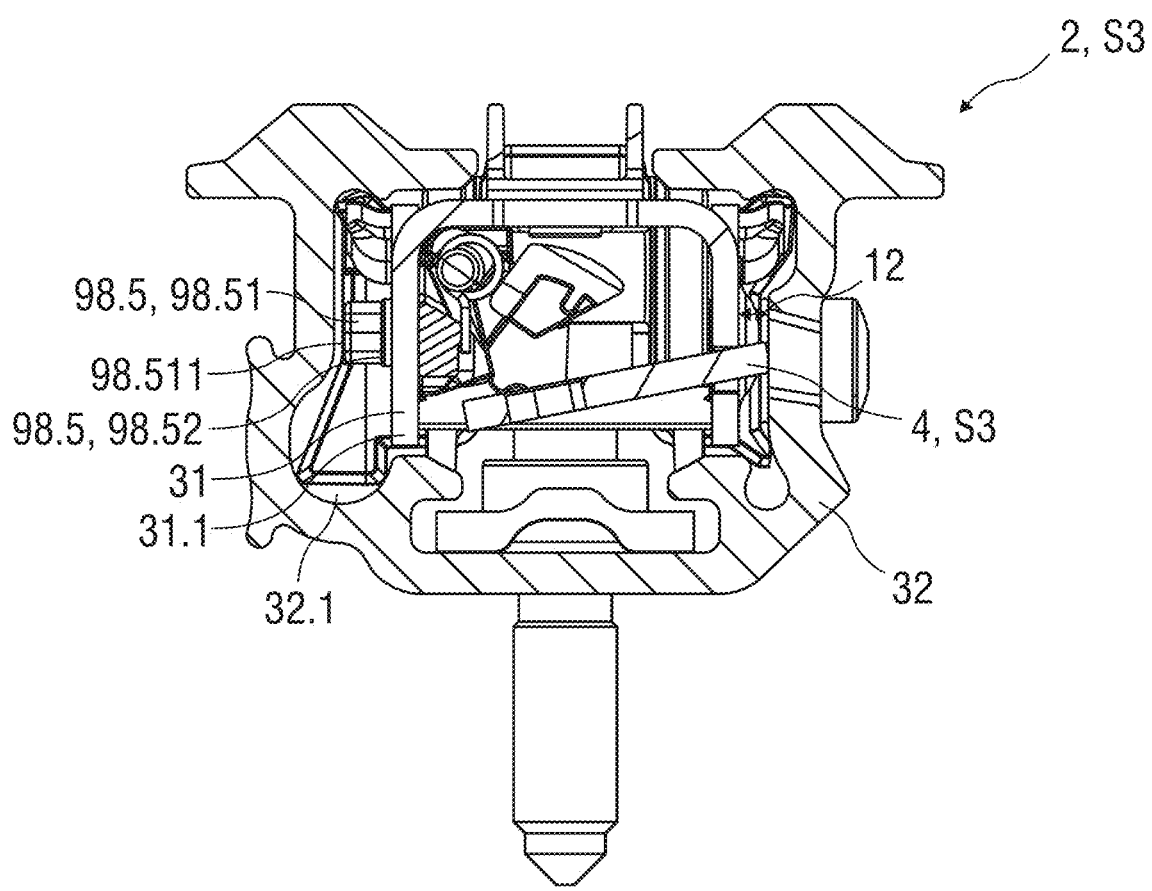
Figure 12:
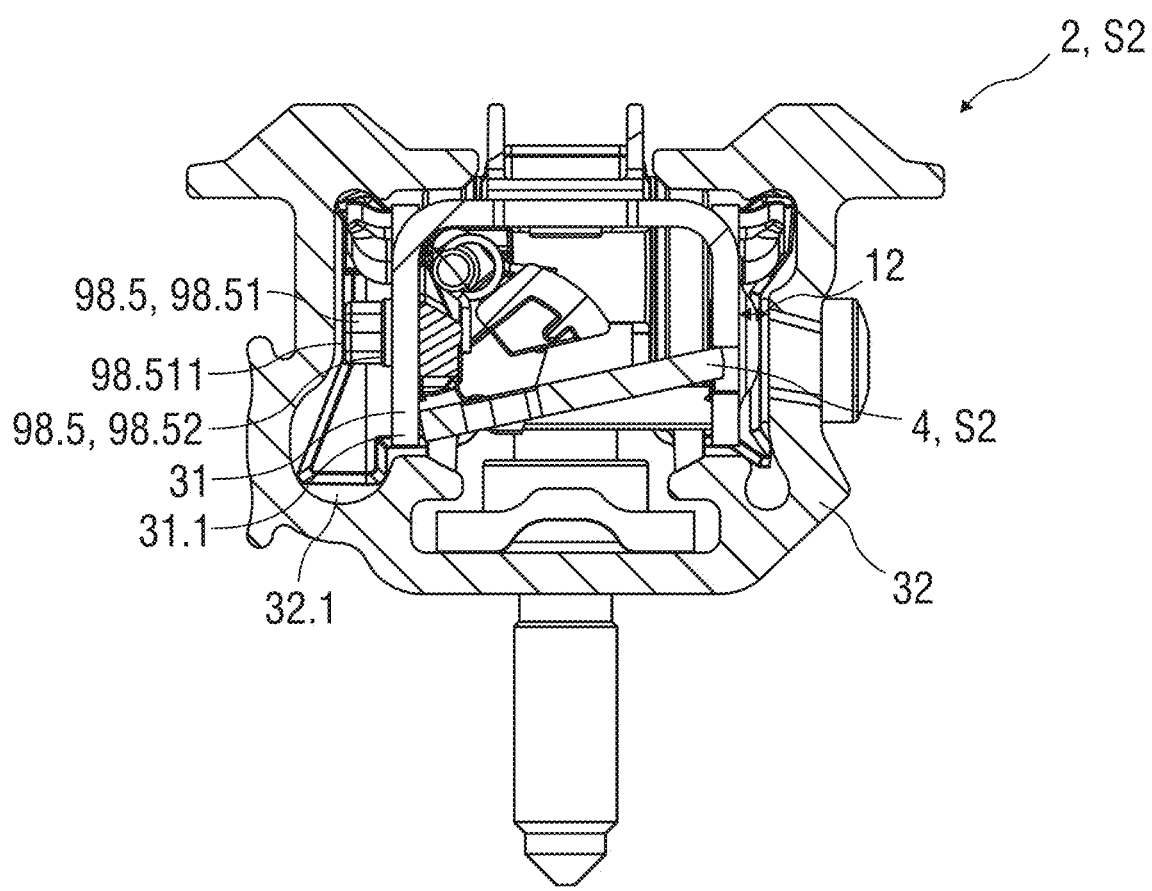

FIGS. 10 to 12 schematically show a sequence of an unlocking of the locking element 4 of the device for longitudinally adjusting a seat 2 according to FIG. 9. The unlocking function of the locking element 4 corresponds to the unlocking function of the locking element 4 according to FIGS. 1 to 8, unless described otherwise below.

FIG. 10 shows the locking element 4 of the device for longitudinally adjusting a seat 2 in the locking position S1.

FIG. 11 shows the locking element 4 of the device for longitudinally adjusting a seat 2 in the intermediate position S3. FIG. 12 shows the locking element 4 of the device for longitudinally adjusting a seat 2 in the unlocking position S2.

FIG. 10 shows the blocking element 98 which engages through the upper rail 31. The blocking element 98 has, for example, at least one elongation 98.5 which protrudes in transverse direction y. At least one elongation 98.51 extends through the upper rail 31 and is arranged opposite with a free end 98.511 of the lower rail 32. In other words: The blocking element 98 is configured by means of the first elongation 98.51, which engages through the upper rail 31 and the free end 98.511 of which is arranged opposite the lower rail 32 in the locking position S1, in such a manner that undesired forces which can be or are introduced into the device for longitudinally adjusting a seat 2 in the locking position S1 are divertable both into the upper rail 31 and into the lower rail 32.

At least one second elongation 98.52 can be arranged to engage through the upper rail 31. This second elongation 98.52 serves in particular to fasten and arrange the blocking element 98 to/on the upper rail 31, in particular to/on its longitudinal side 31.1.

In contrast to the blocking element 98 according to FIGS. 2 to 8 which can discharge undesired forces into the upper rail 31, the blocking element 98 according to FIGS. 9 to 12 can, in the case of undesired forces introduced into the device for longitudinally adjusting a seat 2, additionally divert these forces into the lower rail 32 via this at least one first elongation 98.51 which engages through the upper rail 31.

The rail distance 12 in transverse direction y between the upper rail 31 and the lower rail 32 is larger than in the case of the exemplary embodiments according to FIGS. 1 to 8.

The profile of the lower rail 32 can furthermore be provided with a channel recess 32.1. The channel recess 32.1 extends, for example, over the entire length of the lower rail 32 and can serve, for example, the purpose of receiving and guidance to an electrical line or a cable channel guide (not represented in greater detail).

The features disclosed in the above description, the claims and the figures can be of significance both individually and in combination to achieve the invention in its various configurations in so far as they remain in the scope of protection of the claims.

LIST OF REFERENCE SIGNS

1 Seat
1.1 Backrest
2 Device for longitudinally adjusting a seat
3 Rail pair
31 Upper rail
31.1, 31.2 Longitudinal side
31.3 Elevation
31.4 Depression
32 Lower rail
32.1 Channel recess
33 Apertures
34 Openings
35 Free ends
36 Through-opening
37 Limb region
38 Upper side of the upper rail
381 to 384 Recesses
39 Lower side of the upper rail
4 Locking element
4.1, 4.2 Portion
4.3, 4.4 End
41 Projection
41.1 First projection
41.2 Second, in particular last projection
42 Engagement opening
43 Receptacle
5 Cavity
6 Rolling element
60 Bearing bolt
61 First rolling element
62 Second rolling element
7 Pretensioning element
71 Carrier region
72 Bearing region
73 Spring region
8 Fastening bolt
9 Actuating element
91 Actuating region
92 Coupling region
93 Hook-shaped projection
94 Control cam
95 Rotary bearing
96 Axis
97 Weld seam
98 Blocking element
98.1, 98.2 Portion
98.3, 98.4 End
98.5 Elongation
98.51 First elongation
98.511 Free end
98.52 Second elongation
99 Stop surface
10 Fastening element
101 Receiving opening
102 Weld connection
11 Return element
11.1, 11.2 End
12 Rail distance
BA Actuating axis
P1, P2, P31, P32, P33, P4 Arrow
S1 Locking position
S2 Unlocking position
S3 Intermediate position
x Longitudinal direction, x-axis direction
y Transverse direction, y-axis direction
z Vertical direction, z-axis direction

The invention claimed is:

1. A device for longitudinally adjusting a seat, comprising:
two rail pairs arranged at a distance from one another and at least one locking element,
wherein the rail pairs are formed in each case from an upper rail and a lower rail which are movable relative to one another,
wherein the at least one locking element is spring-loaded and retained movably on the upper rail and, in a locking position, blocks a movement of the upper rail in the lower rail and, in an unlocking position, releases a movement, and
wherein an undesired movement of the locking element out of the locking position is at least restricted or blocked by a blocking element, and
wherein the blocking element is arranged in a cavity formed between the upper rail and the lower rail,
wherein the blocking element is fastened to the upper rail.

2. The device for longitudinally adjusting a seat as claimed in claim 1, wherein the blocking element is fastened to the upper rail, engaging through the upper rail.

3. The device for longitudinally adjusting a seat as claimed in claim 1, wherein the blocking element is arranged on an inner wall of the upper rail in such a manner that undesired movements of the locking element out of the locking position are blocked or at least restricted in such a manner that the locking position of the locking element is secured.

4. The device for longitudinally adjusting a seat as claimed in claim 1, wherein the locking element is formed to be oblique or arched or uneven in portions on a side that faces the blocking element.

5. The device for longitudinally adjusting a seat as claimed in claim 4, wherein the blocking element is formed to be oppositely oblique or oppositely arched or oppositely uneven in portions on a side that faces the locking element corresponding to the locking element.

6. The device for longitudinally adjusting a seat as claimed in claim 1, wherein the upper rail has two longitudinal sides of which one is provided with openings for locking engagement by the locking element, wherein the longitudinal side with the openings is formed to be profiled in portions.

7. The device for longitudinally adjusting a seat as claimed in claim 1, wherein the locking element is arranged and configured in such a manner that it is rotatable at least in regions in the locking position during unlocking and subsequently is pullable into the unlocking position.

8. The device for longitudinally adjusting a seat as claimed in claim 1, wherein the locking element is adjustable a combined rotating-pulling movement or arcuately movable from the locking position into the unlocking position.

9. The device for longitudinally adjusting a seat as claimed in claim 1, wherein an actuating element is provided which is arranged in a cavity formed between the upper rail and the lower rail.

10. The device for longitudinally adjusting a seat as claimed in claim 9, wherein the upper rail has a through-opening through which the actuating element can be actuated.

11. The device for longitudinally adjusting a seat as claimed in claim 9, wherein the actuating element is arranged rotatably movably on the upper rail.

12. The device for longitudinally adjusting a seat as claimed in claim 9, wherein the actuating element comprises at least one actuating region and a coupling region.

13. The device for longitudinally adjusting a seat as claimed in claim 12, wherein the actuating region projects at least into or through the through-opening and the coupling region comprises at least one hook-shaped projection and a control cam.

14. A vehicle seat with the device for longitudinally adjusting the seat according to claim 1.

* * * * *